United States Patent [19]

Kanto et al.

[11] Patent Number: 4,555,914
[45] Date of Patent: Dec. 3, 1985

[54] FREEZING APPARATUS

[75] Inventors: Noriharu Kanto; Yukihiro Hosaka; Yoshio Sasaki, all of Nagasaki; Tatsuo Kuramoto, Fukuoka; Masato Kimura, Oomuta, all of Japan

[73] Assignee: Mitsubishi Denki Kabushiki Kaisha, Tokyo, Japan

[21] Appl. No.: 530,343

[22] Filed: Sep. 8, 1983

[30] Foreign Application Priority Data

Sep. 27, 1982 [JP] Japan .................. 57-170066

[51] Int. Cl.[4] ............................................ F25D 25/04
[52] U.S. Cl. ........................................ 62/380; 62/341; 62/374; 198/773; 198/628; 198/836
[58] Field of Search ................. 62/63, 374, 375, 380, 62/341, 345; 198/773, 846, 952, 628, 836

[56] References Cited

U.S. PATENT DOCUMENTS

| | | | |
|---|---|---|---|
| 3,302,423 | 2/1967 | Morrison | 62/380 |
| 3,324,991 | 6/1967 | Voss | 198/846 |
| 3,832,145 | 8/1974 | Ellithorpe et al. | 62/345 |
| 3,880,274 | 4/1975 | Bechtloff et al. | 198/844 |
| 4,186,797 | 2/1980 | Guttinger et al. | 62/380 |

FOREIGN PATENT DOCUMENTS 51-46818 12/1976 Japan .
54-95047 1/1978 Japan .
55-5022 2/1980 Japan .

*Primary Examiner*—Ronald C. Capossela
*Attorney, Agent, or Firm*—Wenderoth, Lind & Ponack

[57] ABSTRACT

A freezing apparatus is disclosed wherein a first and a second endless belt conveyor are disposed substantially horizontally put one upon another with a predetermined gap being left between the confronting runs of the conveyors, the conveyor belts being adapted to be separately cooled at their rear surfaces by means of cooled brine, and adapted so that products-to-be-frozen can be supplied into the gap from one end with their upper and lower surfaces being kept in contact with the exterior surfaces of the confronting runs of the moving belts to be conveyed towards the other end of the gap, whereby the products are quickly frozen by simultaneous cooling of their upper and lower surfaces. In this case, at least one of the belt conveyors is preferably composed of a flexible belt conveyor made of e.g. a thin rubber sheet.

11 Claims, 3 Drawing Figures

FREEZING APPARATUS

BACKGROUND OF THE INVENTION

The present invention relates to a freezing apparatus and more particularly to an improvement in a freezing apparatus for continuously freezing products that are to be frozen.

Hitherto an apparatus of this kind has been publicly known wherein as shown in FIG. 1 of the attached drawings an endless steel belt 1 made of stainless steel sheet and having a smooth surface is adapted to be driven substantially horizontally by a drive pulley 3 which is provided at the product extraction side 11 and adapted to be driven by a variable speed motor (not shown), the moving speed of steel belt 1 being controlled by the speed control of the variable speed motor so that the freezing time can be adequately regulated. In FIG. 1 the reference numeral 2 is a tension pulley to give steel belt 1 a predetermined tension, provided at the supply side 10 of the products. Disposed below steel belt 1 is a brine tank 4 in abutting relationship therewith, and the products that are to be frozen are adapted to be disposed on the upper surface of steel belt 1. Further, disposed above steel belt 1 is an air blast device comprising cooling coil fins 6 and a fan 7, both enclosed by a ventilating duct 8 so as to form an air circulation passage. The freezing zone 12 thus constituted is contained within an insulating tunnel 9 so as to prevent outside heat from invading freezing zone 12. Brine tank 4 is adapted so that cold brine 13 supplied from a cold brine inlet 14 and discharged from a cold brine exit 15 is recirculated therein, brine 13 being adapted to be cooled by a refrigerator separately installed (not shown). Cooling coil fins 6 are similarly adapted to have a refrigerant circulated therein through a refrigerant inlet 16 and outlet 17, the refrigerant being adapted to be cooled by another refrigerator installed outside.

The operation of the conventional apparatus explained above is as follows:

Upon supply of the products-to-be-frozen on steel belt 1 from product supply side 10, they enter freezing zone 12 along with belt 1 which is continuously travelling at a speed from product supply side 10 to product extraction side 11. During the movement together with belt 1 the products-to-be-frozen 5 are frozen through contact with steel belt 1 which is cooled by the brine 13 contained within brine tank 14 so as to be in contact with the under surface of belt 1. As to the upper surfaces of the products-to-be-frozen 5, they are frozen by an air blast issuing from an ventilating duct 8 within which the air is circulated to be cooled by cooling fin coils 6 and fan 7, both disposed within insulating tunnel 9, whereby fin coils 6 are adapted to be supplied with the refrigerant from the refrigerator installed outside. The products-to-be-frozen 5 thus leave tunnel 9 as steel belt 1 moves to the product extraction side 11, and carried to the succeeding process.

Since the conventional apparatus has such a constitution and operation as above described, although the under surfaces of the products-to-be-frozen are quickly frozen through contact freezing with the steel belt 1, their upper surfaces are frozen slowly by the direct blowing of the cooled air, and simultaneously suffering drying weight loss, deteriorating the quality of the products.

Moreover, since in this conventional apparatus two refrigerating systems, i.e. one for the cooling of the brine and the other for the cooling of the air blast, two refrigerators are required, increasing both the initial and running cost of the equipment.

An apparatus for rapidly cooling food has been publicly known as disclosed in Japanese Laid-Open Patent Publication No. 95047/1979 in which after the upper surface of the products-to-be-frozen have been rapidly frozen by injecting liquified gas or spreading dry ice on the moving products the under surface of the products are subsequently rapidly frozen on a steel belt the under surface of which is cooled by a freezing element.

Also a freezing apparatus has been publicly known as disclosed in Japanese Patent Publication No. 5022/1970 in which at least one of the contact surfaces between a belt conveyor and a cooling vessel against which the belt conveyor contacts are formed with a thin film which contains a good heat conductive and lubricative substance so that the lubricability and heat conductivity between the belt conveyor and the cooling vessel are improved.

Further, Japanese Patent Publication No. 46818/1976 discloses a method for cooling packaged food which is characterized in that packaged food at high temperature is sprayed with a sterilization liquid such as hydrogen peroxide, etc. in the form of a mist or a shower, and subsequently the liquid adhered on the packaged product is vapourized by cooling it with forced air, whereby the packaged product is rapidly cooled.

However, none of the publicly known apparatuses or methods teach or suggest the use of a flexible belt conveyor for rapidly freezing food-to-be-frozen as disclosed in the present invention to be fully described below.

OBJECTS AND SUMMARY OF THE INVENTION

It is an object of the present invention to provide a freezing apparatus which can eliminate the defects in the conventional types as described above.

It is another object of the present invention to provide a freezing apparatus which makes it possible to rapidly freeze both surface of products-to-be-frozen through a contact freezing process.

It is a further object of the present invention to provide a freezing apparatus which can maintain the freshness of products-to-be-frozen when the products are e.g. food.

In accordance with the present invention a freezing apparatus is provided wherein a first and a second endless belt conveyor are disposed substantially horizontally in parallel with each other so as to be put one upon another with a predetermined gap being left between their confronting runs, the conveyor belts being adapted to have their rear surfaces separately cooled by means of e.g. cooled brines, and the products-to-be-frozen are supplied between the gap from its one end so that their upper and lower surfaces are kept in contact with the confronting runs of the belts, respectively, whereby both surfaces of the products-to-be-frozen are respectively cooled by the belts separately, resulting in rapid freezing of the products, and, further, in the present invention it is proposed that at least one of the belt conveyors is constituted by a flexible endless belt conveyor made of e.g. a thin rubber sheet.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENTS

Figure 1:
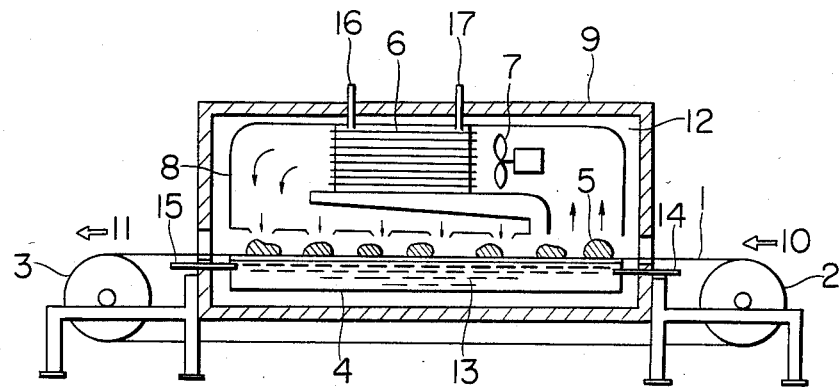
FIG. 1 is a diagrammatical longitudinal sectional front elevational view of a conventional freezing apparatus.
Figure 2:
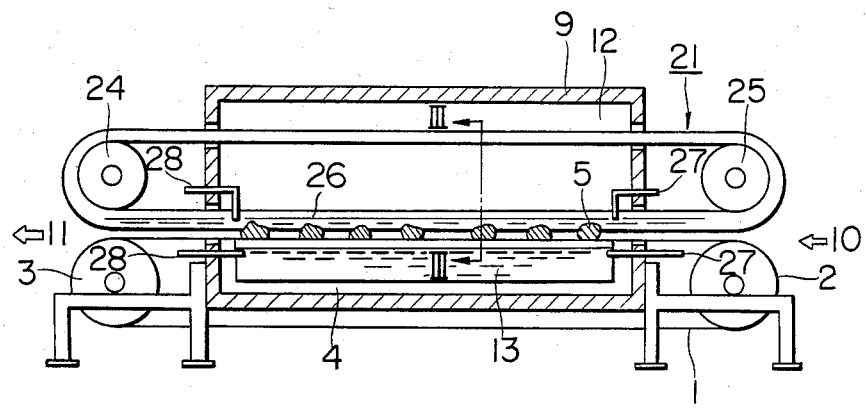
FIG. 2 is a diagrammatical longitudinal sectional front elevational view of one embodiment of a freezing apparatus in accordance with the present invention.
Figure 3:
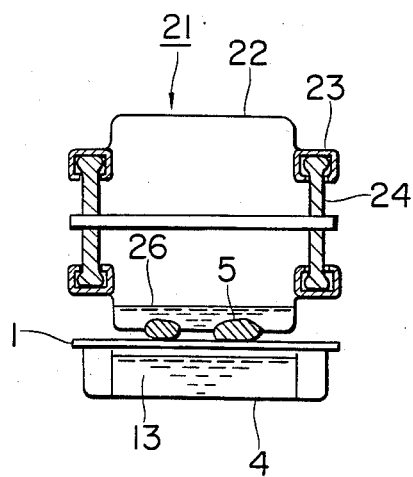
FIG. 3 is a cross sectional view of the apparatus shown in FIG. 2 taken along the line III—III of FIG. 2.

Referring now to FIG. 2 of the attached drawings wherein an endless flexible belt conveyor 21 is disposed above an endless steel belt conveyor 1, that is similar to one shown in FIG. 1, in parallel with each other with a predetermined distance being left there between. The cross sectional configuration of flexible belt conveyor 21 is shown in FIG. 3. Flexible belt conveyor 21 having such a cross section is constituted by shaping a belt-like material that is made e.g. by bonding a thin rubber sheet which has excellent tensile strength, elasticity, flexibility, air-tightness (and therefore water tightness), etc. at low temperatures to basic cloth as a reinforcing material. Although this material is less heat conductive than metal it can be easily adapted by making its thickness thin. Endless guide belts 23 each having generally a U-shaped cross-section and made of a flexible belt material are integrally formed with flexible belt 22 at its both edges, respectively, and guide belts 23 are adapted to be disposed between a drive pulley 24 and a tension pulley 25 quite similarly to drive pulley 3 and tension pulley 2 for steel conveyor belt 1, so as to constitute flexible belt conveyor 21. The inside of the lower part of flexible belt conveyor 21 is filled with a cooled brine 26 to be maintained therein at a predetermined minimum level thereof. Brines 13 and 26 respectively contained in a brine tank 4 for steel belt 1 and inside flexible belt conveyor 21 are adapted to be supplied from a refrigerator (not shown) installed outside through cooled brine inlets 27, respectively, and discharged through brine exits 28, respectively, therefrom to return to the refrigerator, whereby the brines recirculate through both.

Steel belt conveyor 1 and flexible belt conveyor 21 are adapted to be driven by a common drive means through drive pulleys 3 and 24, respectively, and controlled to have their confronting runs driven at the same velocity.

Although in FIG. 2 only the freezing zone 12 is shown surrounded by a heat insulation tunnel or housing 9 it is, of course, conceivable that the apparatus can be entirely surrounded by heat insulating equipment.

Next, the operation of the apparatus described above will be explained below.

Upon supply of the products-to-be-frozen 5 at product supply side 10, products 5 put between steel belt conveyor 1 and flexible belt conveyor 21 enter freezing zone 12. While products 5 are travelling through freezing zone 12 the under surfaces of products 5 are cooled by steel belt conveyor 1 in contact therewith, and since the upper surfaces of products 5 are also in contact with flexible belt conveyor 21 which is cooled by cooled brine 26 the heat conduction between them takes place rapidly owing to the contact freezing. In this case, even if the shape, dimension, etc. of the products-to-be-frozen 5 vary, since flexible belt 22, constituting, flexible belt conveyor 21, coming into constant contact with products 5 changes its cross-sectional configuration in accordance with the shapes of products 5 as shown in FIG. 3 it always maintains contact with products 5 so that a condition having good heat conductivity can be maintained due to the contact cooling. Thus, the apparatus in accordance with the present invention makes it possible to rapidly freeze both of the upper and lower surfaces of products 5 through contact freezing. In particular, in the case of meat it is possible to rapidly freeze both surface so that the maintenance of freshness of the meat, the improvement of its quality, etc. can be realized.

Since the drive of flexible belt conveyor 21 is carried out by drive pulley 24 and tension pulley 25 through guide belts 23 no direct force is applied to flexible belt 22 itself, avoiding any fear of its tearing, etc. Upon the arrival of the frozen products 5 at the product extraction side 11 after the passage through freezing zone 12, since steel belt conveyor 1 rotates at the belt pulley portion 3 products 5 are naturally separated from steel belt conveyor 1 to be transferred to the succeeding process.

Although in the above embodiment the case where meat is continuously rapidly frozen has been explained, the field of application of the apparatus in accordance with the present invention is not limited to meat only, instead it is also utilized for the freezing of conditioned frozen foods, principally fish, vegetables, etc., revealing similar effects as for meat.

It is also possible that the flexible belt conveyor be not provided at the upper side of the apparatus, but instead it may be provided either at the lower side in place of the steel belt conveyor, or at the upper as well as the lower sides of the apparatus.

It is to be understood that although certain forms of the present invention have been illustrated and described, it is not to be limited thereto except insofar as such limitations are included in the following claims.

What is claimed is:

1. A freezing apparatus comprising a first and a second endless belt conveyor put one upon another, said first conveyor above said second conveyor, substantially horizontally so as to have confronting runs, means for driving said first and second conveyors to drive their confronting runs in the same direction, and means, including the conveyor belt of said first conveyor, for freezing products-to-be-frozen which are put between said confronting runs of said first and second conveyors while the products are conveyed by said first and second conveyors through said runs of the conveyor belts thereof by cooling them with said freezing means, the conveyor belt of said first belt conveyor being an endless elastic flexible belt capable of elastically holding the products between said confronting runs, said flexible belt being heat transmissive and conveyors to a cooling liquid, said flexible belt being sufficiently flexible and elastic that the portion thereof along said confronting runs bows down under the weight of cooling liquid on the upper surface of said portion, such that the upper surface of said flexible belt along said confronting runs comprises means for containing the cooling liquid so as to draw heat from the products to be frozen through said flexible belt.

2. A freezing apparatus as claimed in claim 1, wherein said endless flexible belt comprises reinforcing cloth and a shaped thin sheet having excellent tensile strength, elasticity, flexibility, and airtightness at low temperatures bonded to said cloth.

3. A freezing apparatus as claimed in claim 2, further comprising two flexible endless guide belts having generally U-shaped cross sections, respectively integrally formed at the lateral sides of said flexible belt.

4. A freezing apparatus as in claim 2, further comprising generally U-shaped guide belts integrally formed on opposite lateral sides of said one of said first and second belts.

5. A freezing apparatus as in claim 1, wherein said belt of the other of said first and second conveyors is formed of steel and is disposed below said flexible belt.

6. A freezing apparatus as in claim 5, wherein said flexible belt is flexible, elastic and airtight at low temperatures.

7. A freezing apparatus as in claim 5, wherein said freezing means comprises a first quantity of cooling liquid supported by said upper surface of said portion of said flexible belt and means for holding a second quantity of cooling liquid in contact with said steel belt.

8. A freezing apparatus as in claim 1, wherein said flexible belt is flexible, elastic and airtight at low temperatures.

9. A freezing apparatus, as in claim 1, wherein said flexible belt is formed of a thin sheet of rubber.

10. A freezing apparatus, comprising:

a. a first horizontally extending endless belt conveyor having a first endless conveyor belt;

b. a second horizontally extending endless belt conveyor having a second endless conveyor belt, said first conveyor being disposed over said second conveyor so that said first and second belts have confronting runs, said first belt comprising a shaped endless belt formed of reinforcing cloth and a thin rubber sheet which is flexible, elastic and impervious to liquid refrigerant at low temperatures and has good tensile strength, at low temperatures, bonded to said reinforcing cloth, and said second belt being formed of steel, said first belt being sufficiently flexible and elastic that the portion thereof along said confronting runs bows under the weight of refrigerant liquid on the upper surface of said portion, such that said upper surface of said first belt along said confronting runs comprises means for containing the refrigerant liquid so as to draw heat from the products to be frozen through said first belts;

c. means for driving said first and second conveyors so as to drive the confronting runs of said first and second belts in the same direction; and d. means, including said first conveyor belt, for freezing products conveyed by said first and second conveyors between said confronting runs.

11. A freezing apparatus, as in claim 10, wherein said freezing means includes first and second quantities refrigerant liquid respectively in contact with said first and second belts so as to freeze the products therethrough.

* * * * *